(12) United States Patent  (10) Patent No.: US 7,720,296 B2
Hahn et al.  (45) Date of Patent: May 18, 2010

(54) METHOD FOR DETERMINING A DISPLACEMENT VECTOR IN AN IMAGE PROCESSING OPERATION

(75) Inventors: Marko Hahn, Neubiberg (DE); Christian Tuschen, Munich (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 816 days.

(21) Appl. No.: 10/561,658

(22) PCT Filed: Jun. 14, 2004

(86) PCT No.: PCT/EP2004/006398

§ 371 (c)(1),
(2), (4) Date: Feb. 2, 2006

(87) PCT Pub. No.: WO2004/111939

PCT Pub. Date: Dec. 23, 2004

(65) Prior Publication Data

US 2007/0098279 A1  May 3, 2007

(30) Foreign Application Priority Data

Jun. 18, 2003 (DE) ............... 103 27 577

(51) Int. Cl.
G06K 9/36 (2006.01)
G06K 9/46 (2006.01)
G06K 9/00 (2006.01)
H04N 7/12 (2006.01)
H04N 5/14 (2006.01)

(52) U.S. Cl. ............ 382/236; 382/107; 382/100; 382/106; 348/402.1; 348/413.1; 348/416.1; 348/699; 375/240.13; 375/240.16

(58) Field of Classification Search .......... 382/106, 382/103, 107, 236; 348/402.1, 413.1, 416.1, 348/699; 375/240.13, 240.16
See application file for complete search history.

(56) References Cited

U.S. PATENT DOCUMENTS 5,327,232 A 7/1994 Kim .................. 348/412
6,385,245 B1 * 5/2002 De Haan et al. ...... 375/240.16

FOREIGN PATENT DOCUMENTS

EP 0542153 5/1993 ............ 5/14

OTHER PUBLICATIONS

Haan et al.; True-Motion Estimation with 3-D Recursive Search block Matching, IEEE Transactions on Circuits and Systems for Video Technology, 1993, vol. 3, No. 5, 368-379.*
Madisetti et al. "The Digital Signal Processing Handbook", 1998, p. 54-11-54-19.

* cited by examiner

Primary Examiner—Charles Kim
Assistant Examiner—Thomas A Conway
(74) Attorney, Agent, or Firm—DLA Piper LLP (US)

(57) ABSTRACT

In a method to determine a selection vector that indicates a displacement of an image area from a first position in a first image to a second position in a second image, a set of prediction vectors and a set of test vectors are provided. Using selected test vectors, an image comparison is performed to supply an image comparison result for each selected test vector. The selected test vectors and at least one prediction vector are compared to provide at least one test vector comparison result for each selected test vector. The image comparison result and the at least one test vector comparison result are linked to provide at least one quality characteristic for each selected test vector. A ranking order is determined for these quality characteristics, where at least one test vector is selected as the displacement vector based on the ranking order determined.

20 Claims, 4 Drawing Sheets

| | V1 | V2 | V3 | V4 |
|---|---|---|---|---|
| T1 | 1 | 3 | 5 | 8 |
| T2 | 2 | 7 | 6 | 7 |
| T3 | 8 | 3.5 | 4 | 11 |

METHOD FOR DETERMINING A DISPLACEMENT VECTOR IN AN IMAGE PROCESSING OPERATION

BACKGROUND INFORMATION

The present invention relates in general to image processing and in particular to a method for determining a displacement vector in an image processing operation.

In image processing, displacement vectors or motion vectors function by a known approach to define a change in position of an object or image area from a first position within a first image to a second position within a second image.

The two images can be recorded temporally sequentially, thereby graphically representing a movement of the object or image area in a displayed image segment over time. In such cases, the motion vector serves, for example, to interpolate one or more intermediate images which reproduce the position of the object at one or more instants in time between the recording of the first and second images, for example, in the case of 50 Hz/100 Hz video conversion or when generating "artificial time expansions."

The two images can also be recorded simultaneously from first and second camera positions, where the displacement vector to be determined serves to generate an intermediate image which shows the object from another virtual camera position which is located at a position different from the first and second camera positions.

FIG. 1 illustrates two images B1, B2, which may have been recorded in temporal succession or from different camera positions, having a first image area 1 at a first position P1 within the first image B1, and a second image area 2 at a second position P2 within the second image B2. For simplicity, the first and second image areas 1, 2 are represented as squares, the midpoints of which are identified by the positions P1, P2 within the image areas. The image areas may have any desired shape.

As FIG. 1 illustrates, the second image area 2 in the second image B2 results from a displacement of the first image area 1 of the first image B1 by a displacement vector vec. This displacement can be a function of time when the two images B1, B2 are recorded in succession and an object representing the first image area 1 moves within the examined image segment from the position P1 at the instant the first image B1 is recorded to the position 2 at the instant the second image B2 is recorded. This displacement of the two image areas 1, 2 within the displayed image segment can also be the result of the fact that the two images B1, B2 are recorded at the same instant but from different viewing angles.

One basic approach, known for determining this type of displacement vector for a given image area or object, is to divide the image into individual image areas and supply test vectors, each of which represents a possible displacement vector for the individual image areas. Using these test vectors, image comparisons are performed by which image information, for example, luminance values or chrominance values for the individual pixels of an examined image area in the first image, is compared with image information values for a second image area in the second image, where one selection vector each is used to displace the position of the second image area in the second image relative to the position of the first image area in the first image. Out of the various test vectors, the one or more selection vectors are chosen which provide the "best" comparison result, for which the best match is determined between the first and second image areas.

The quality of this method is a function of the selection vectors chosen since it is difficult from a practical view to perform an image comparison for all of the possible displacement vectors due to the need to keep the already high computational effort within certain limits. It is thus a fundamental goal of these methods to reduce the number of required image comparisons without accepting degradation of the result in the determination of the at least one selection vector.

A known method for reducing the effort/complexity is to utilize certain prior information in the selection of test vectors for a given image area, which information has been obtained, for example, in previous search steps for the given image area, or in search steps for an adjacent image area. This prior information results in a group of prediction vectors from which the test vectors are generated or selected. These prediction vectors, which were obtained using search steps for adjacent image areas or using previous search steps for the image areas examined, can be accepted as the test vector for the area of interest, and/or the test vectors can be generated from these prediction vectors by changing their length and/or direction according to a predetermined or random scheme, whereby in this last-named case the prediction vectors can change from search step to search step.

The selection vectors determined from the test vectors can be utilized as new prediction vectors during the subsequent search steps.

To illustrate this method, FIG. 2 provides a schematic view of a known vector search system which determines displacement vectors for individual image areas and which incorporates prediction vectors to determine a possible displacement vector, the prediction vectors containing results from previous search steps for the same image area, or results from search steps for adjacent image areas. The system comprises a test vector determination unit 10 to which a set of prediction vectors are supplied and which provides a set of test vectors from these prediction vectors. The provision of test vectors can be implemented by passing on unchanged some or all of the prediction vectors as test vectors. In addition, it is possible to modify some or all the prediction vectors according to a fixed or random scheme to generate the test vectors.

The test vectors are employed in an image comparison unit 20, connected to the output of the test vector determination unit 10, to perform image comparisons for the individual image areas, where, with reference to FIG. 1, one image area 1 from the first image B1 is always compared with an image area 2 from the second image B2, while from the second image B2 for each comparison that second image area is selected, the geometry of which matches the geometry of the first image area 1 and which area is displaced relative to the first image area 1 of the first image 1 by one of the selection vectors.

The results determined for the individual comparisons are supplied to a selection unit 30 which, based on the comparison results, selects at least one selection vector for which the best comparison result was determined out of the group of test vectors. The at least one vector selected based on the comparison results represents the actual displacement vector, or at least the most likely displacement vector, which maps the first image area 1 from the first image B1 onto the second image area 2 in the second image B2. In the determination of the comparison result, it is possible to evaluate the test vectors differently as a function of how they were generated. For example, it is possible in the image comparison to "penalize" the prediction vectors or test vectors determined based on the image comparisons for previous images, that is, to grade them lower than test vectors that were determined for adjacent image areas within the same image.

In this known method, the selection vectors are always a function of the prediction vectors. However, an appropriate utilization of these prediction vectors requires that the displacement of adjacent image areas, or the displacement of the image area of interest, does not undergo significant variations over time, since it must be ensured that the selection vectors determined from the prediction vectors also contain the actual displacement vector. Otherwise a considerable expansion in the number of selection vectors is required.

What is needed is an improved method for determining in image processing at least one selection vector which is in particular capable of taking into account rapid changes in the displacement vectors.

SUMMARY OF THE INVENTION

In the method according to the invention to determine a selection vector which indicates a displacement of an image area from a first position in a first image to a second position in a second image, a set of prediction vectors and a set of test vectors are provided. The prediction vectors can be obtained by conventional methods to generate prediction vectors, for example, by utilizing information from a search of displacement vectors for adjacent image areas or from the previous search of displacement vectors for the image area of interest.

Using selected test vectors from the set of test vectors, an image comparison is performed to supply an image comparison result for each of the selected test vectors. In addition, the selected test vectors and at least one of the prediction vectors are compared to provide at least one test vector comparison result for each of the selected test vectors. Subsequently, the image comparison result determined for the selected test vector and the at least one test vector comparison result determined for a selected test vector are linked to provide at least one quality characteristic for each of the selected test vectors. A ranking order is determined for these quality characteristics, where at least one test vector is selected as the displacement vector based on the ranking order determined.

The test vectors are preset and cover different possible displacements of the image area of interest within a specified image raster. In the method according to the invention, the information contained in the prediction vectors is taken into account by the fact that, in addition to the image comparison result obtained from the test vector, the distance of the test vector from the prediction vector is determined when selecting one of the test vectors as the displacement vector.

The image comparison result for the selected test vector can be determined using conventional methods by comparing the image information of the pixels from a first image area in the first image with image information values of the pixels from a second image area in the second image, where the position of the first image area relative to the position of the second image area is displaced by the test vector in question. If these two image areas are superimposed, then assuming geometrically identical image areas, for each pixel of the first image area located at a given position in this image area, one pixel of the second image area is associated which is located at the corresponding position in the second image area. The determination of the comparison result can comprise the comparison of the image information values of all the pixels in the two image areas, or the comparison of the image information values of selected representative pixels, where the individual pixel comparison results are summed to obtain the image comparison result. A pixel comparison result for a pixel from the first image area and an associated pixel from the second image area can be obtained, for example, by generating the difference in the two image information values;

determining the absolute value of the difference for the two image information values;

forming the square of the difference in the two image information values.

Any number of other mathematical methods which provide a measure for the match or differences between two image areas is possible.

In addition, it is possible to incorporate into the image comparison additional pixels which are located outside the compared image areas, or to incorporate additional pixels which are generated, for example, by interpolating the given pixels of the image areas examined.

The image comparison is performed by supplying a numerical value for each comparison of two image areas, which value is, for example, increasingly smaller the greater the match between the compared image areas.

To determine the vector comparison result for a test vector as a function of a prediction vector, for example, the absolute value or the square of a difference vector for these two vectors is determined. As a result, for each comparison of a test vector with a prediction vector, a numerical value is obtained which is increasingly smaller the less the test vector and the prediction vector deviate from each other.

In the determination of this vector comparison result, it is possible to take into account how the prediction vector was determined. For example, the prediction vector can be a displacement vector which was determined for adjacent image areas of the image area of interest, or the prediction vector can be a displacement vector which was determined for the image area of interest or image areas adjacent thereto in a preceding image. In determining the vector comparison result, it is possible, for example, to "penalize" a prediction vector which was determined based on a preceding image, that is, to output a worse vector comparison result for this vector than for an identical vector which was determined based on an adjacent image area within the same image.

The penalization can be achieved by multiplying the determined comparison result by a multiplication factor, the multiplication factor being externally adjustable and, for example, determining the manner of generating the prediction vector. Instead of multiplication by a penalization-dependent factor, it is also possible to add a value dependent on the desired degree of penalization to the determined comparison result.

If one takes the locational or temporal origin of a prediction vector as a function of the image segment for which the image comparison is implemented as the criterion for penalization, then the penalization relates to all the comparison results of this prediction vector with the test vectors. In addition to the locational or temporal origin of the prediction vector, it is also possible to utilize still other criteria for a penalization. For example, there is the possibility of utilizing the absolute length of a test vector as the penalization criterion, where test vectors having a large absolute length are penalized if it is assumed, for example, that motion sequences occurring in the images proceed slowly.

In addition, there is the possibility of incorporating the structure of the image into the determination of a suitable selection vector. If, for example, self-similar structures, that is, monotone areas, are present, it may be useful to obtain selection vectors that deviate as little as possible from the previously prediction vectors determined. If the result of the vector comparison is a numerical value which becomes larger the more strongly a test vector deviates from a prediction vector, then this goal can be achieved by weighting each vector comparison result with a value greater than one, with the result that for test vectors that deviate strongly from the prediction vectors, viewed in absolute terms, especially "bad" vector comparison results enter into the quality consideration. Self-similar structures can be determined by an image comparison —normally a block-by-block image comparison— within the image.

To generate the quality characteristic of a test vector in regard to a prediction vector, the image comparison result determined for the test vector and the test vector comparison result are linked to each other, the linking being effected such that, given an identical image comparison result, the quality characteristic improves the less the test vector and the selected prediction vector differ. Assuming that only the "best" test vectors are selected from the ranking order determined, those test vectors will thus be preferred which differ little from the prediction vectors. This consideration of the origin of a prediction vector in the image comparison can be effected, for example, by providing the comparison result with an offset, the value of which is a function of the origin of the given prediction vector.

The quality characteristic can be determined by a weighted addition of the numerical value obtained from the image comparison result and of the value obtained from the vector comparison result, where, for one test vector, multiple quality characteristics are determined, the number of which corresponds to the number of prediction vectors with which the selected test vector is compared.

In one embodiment, the vector comparisons are performed between the selected test vectors and all the prediction vectors to obtain, for each of the selected test vectors, a number of vector comparison results corresponding to the number of prediction vectors. Preferably, a ranking order of the vector comparison results is determined and only the "best" vector comparison result is utilized to generate the quality characteristic, such that for each test vector precisely one quality characteristic is determined.

In another embodiment, for each prediction vector the best test vector for this prediction vector is determined, where, for example, one or more test vectors are selected as the selection vector which have been determined most frequently as the best test vector for the selection vectors. It is also possible to select a set of test vectors for each prediction vector.

Preferably, all the test vectors are selected, that is, image comparisons are performed for all the test vectors, where additionally for all the test vectors vector comparisons can be performed with all the prediction vectors.

The selection of the at least one test vector as the selection vector is preferably achieved iteratively by first providing a set of fixed selection vectors from which the "best" one or more test vectors are selected based on the ranking order determined using the image comparison results and the vector comparison results. Subsequently in the next iteration step, a second group of test vectors is determined from these best test vectors, where the test vectors of this second group are generated from the previously selected best test vectors.

Generation of these test vectors of the second group is achieved, for example, by adding in each case predetermined modification vectors to the previously selected test vectors of the first set. One or more of the test vectors from the second group can also be generated for one of the selected test vectors. The modification vectors are preferably selected such that the differences between these test vectors produced by adding the modification vectors to one of the previously selected test vectors are smaller than the variations of the individual test vectors from the first group.

Another ranking order is generated for the test vectors of the second group based on the image comparison results and the vector comparison results, which ranking order is employed to select at least one test vector used to generate a selection vector, or is employed to select one or more of the test vectors from which another group of test vectors is generated for another iteration step using modification vectors.

In one embodiment, a ranking order of test vectors is determined for each prediction vector, and the respective best test vector for each of the prediction vectors is used for the subsequent iteration step. After the last iteration step, it is possible to select from the set of "best" test vectors that test vector as the selection vector to which the best quality characteristic is assigned.

When determining the vector comparison result, it is also possible in the case of iterative methods to take into account the origin of the prediction vector.

In addition, it is possible to divide the prediction vectors into groups by their origin, for example, into prediction vectors that were determined based on the previous image for adjacent image areas relative to the image area of interest, prediction vectors that were determined based on a previous image for the image area of interest, and prediction vectors that were determined based on the current image for adjacent image areas relative to the image area of interest. For each of these groups, the best one or more test vectors are determined during each iteration step for the subsequent iteration step. Upon completion of the iteration procedure, in addition to the determination of a selection vector based on the ranking order of the best test vectors, it is possible to store that best test vector determined for a specific group as a new prediction vector.

Preferably, the modification vectors comprise the zero vector, such that the test vectors selected at the end of an iteration step, from which based on the modification vectors the set of test vectors for the next iteration step is generated, are contained within this set of test vectors for the next iteration step.

Preferably, the individual modification vectors match in terms of their direction for the individual iteration steps, but become smaller in terms of their absolute value from iteration step to iteration step such that with each iteration step test vectors are generated for which the difference is smaller.

In addition, it is possible to select the modification vectors as a function of the previously determined quality criterion. If, for example, for each selection vector that best test vector is determined, from which one or more vectors nevertheless provide a worse quality criterion, then in this embodiment these test vectors are subjected, for example, to greater modifications since it must be assumed that smaller modifications would not produce any significant improvement. Conversely, test vectors that provide a good result are modified only slightly or not at all during the subsequent step.

Viewed in its entirety, this type of iterative method is based on a set of test vectors that is generated from an original set of test vectors by means of all the possible combinations with the modification vectors, where, however, during the individual iteration steps test vectors are repeatedly rejected to keep the computational effort within limits.

The method according to the invention for determining a selection vector can be applied in a method to determine a set of selection vectors wherein selection vectors are determined using the method explained above, where as many test vectors are selected as selection vectors are required based on the determined ranking order of the quality characteristic.

The method can also serve as an expansion of a known method in which one or more prediction vectors are employed as selection vectors, and which is improved by employing at least one test vector which was selected based on the ranking order of quality characteristics as the selection vector.

In both methods, the selection vectors can function as prediction vectors for the next vector search step of the image area examined, where the selection vectors can be accepted unchanged as prediction vectors, or can be changed based on a preset or random scheme to generate the new prediction vectors. In this last-presented method in which prediction vectors and test vectors are employed as selection vectors, preferably those selection vectors from the previous step which provide the worst image comparison result are no longer utilized as new prediction vectors but are instead replaced by test vectors determined based on the ranking order.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
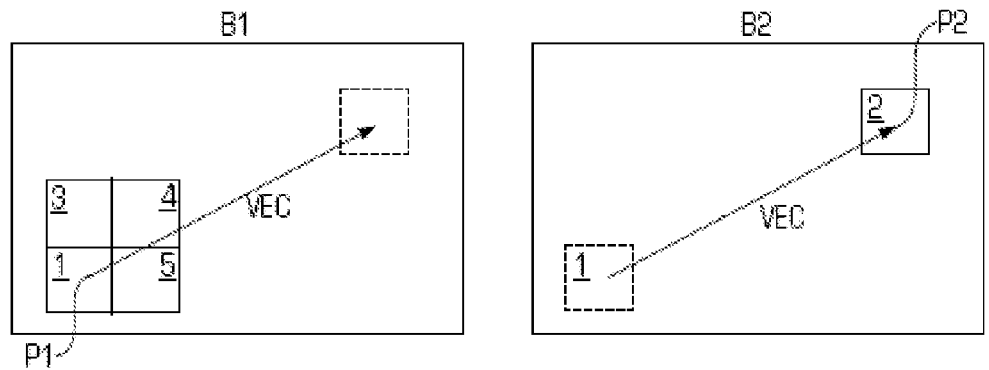
FIG. 1 illustrates first and second images, each having image areas which relate to each other through a displacement vector.
Figure 2:
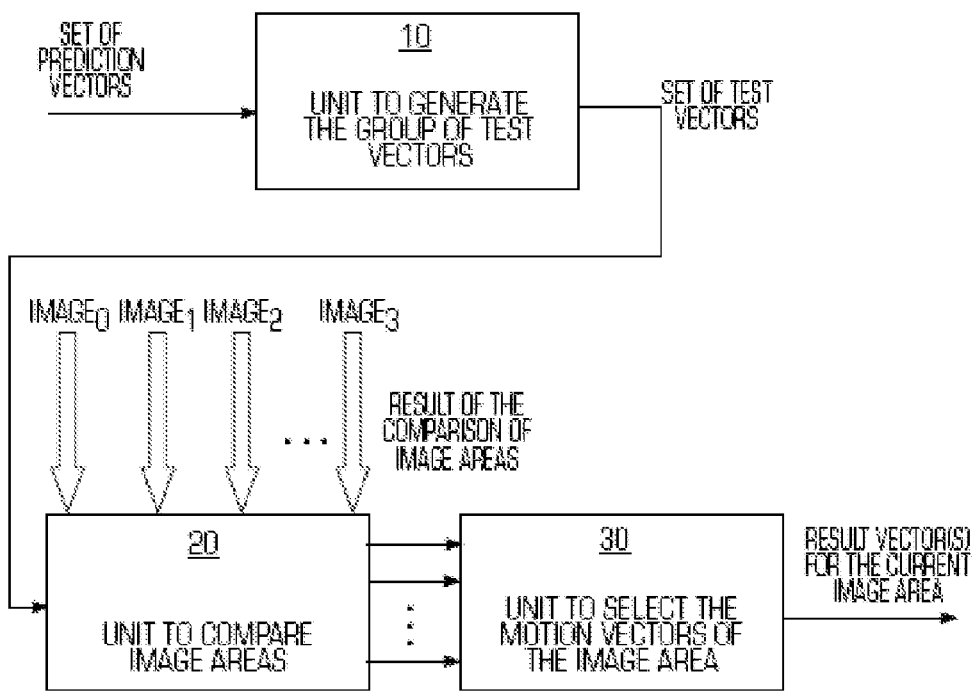
FIG. 2 is a block diagram of a known system for supplying a set of selection vectors using prediction vectors.

In the figures, unless otherwise indicated, identical reference notations indicate identical components or procedural steps. Referring to the flowchart of FIG. 3, an embodiment of the method of the invention for determining at least one selection vector which, with reference to the example of FIG. 1, represents a possible displacement vector for displacing the first image area 1 from the first position P1 in the first image B1 to the second position P2 in the second image B2. As previously explained, the selection vectors perform image comparisons between image areas in the first image B1 and the second image B2, the compared image areas being displaced relative to each other by one each of the selection vectors. The selection vector accepted is the actual or most likely displacement vector which provides the "best" image comparison result.

Figure 3:
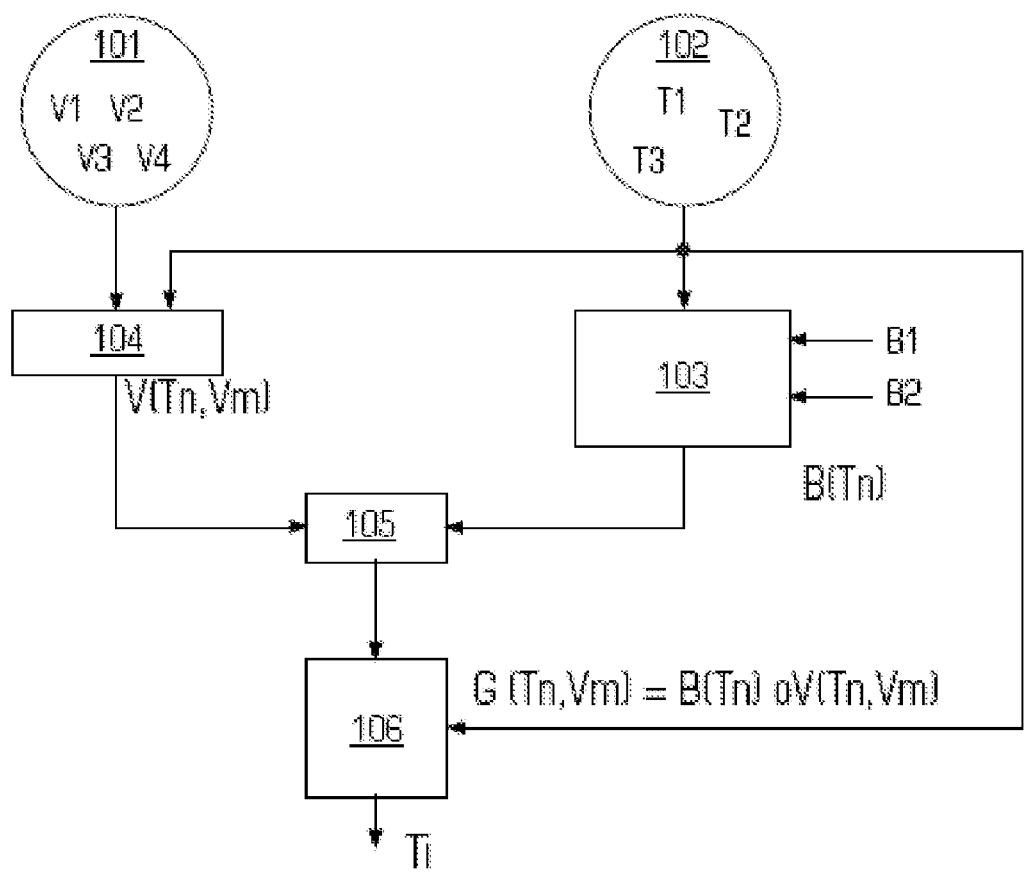
FIG. 3 is a flowchart for a method according to the invention for supplying at least one selection vector using a set of test vectors and a set of prediction vectors.

In the method according to the invention for supplying at least one selection vector, a set of prediction vectors 101 is supplied, FIG. 3 illustrating as examples four such prediction vectors V1, V2, V3, V4. These prediction vectors V1-V4 can be supplied using conventional methods to determine prediction vectors. These methods comprise, for example, supplying prediction vectors for a given image area based on already determined displacement vectors for adjacent image areas of the given image area. For example, it is possible, as illustrated in FIG. 1, to determine the prediction vectors for the image area 1 using displacement vectors that were determined for adjacent image areas 3, 4, 5 of the first image area. In addition, it is possible to determine prediction vectors for a given image area using selection vectors that were determined for the image area 1 during the previous vector search steps.

Also according to the invention, a set of test vectors 102 is supplied, three such test vectors T1, T2, T3 being illustrated by way of example in FIG. 3.

From this set of test vectors 102, at least one test vector is selected, although preferably all the test vectors T1-T3 are selected, and in a step 103 these test vectors are used to perform image comparisons to supply an image comparison result for each of the selected test vectors T1-T3, which result is identified in FIG. 3 as B(Tn), where Tn represents any selected test vector T1-T3. The image comparison comprises the comparison of the first image area 1 in the first image B1 with the second image area 2 in the second image B2, where the position P2 of the second image area B2 is displaced relative to the position P1 of the first image area 1 by that one of the selected test vectors for which the image comparison result is determined.

With reference to FIG. 1, the displacement vector vec for each image comparison is replaced by another of the selected test vectors T1-T3. For the purpose of the image comparison, image areas constructed from a number of pixels are compared by comparing image information values, for example luminance values or chrominance values of two pixels each located in the first image area 1 and in the second image area 2 at the corresponding pixel positions, where the individual comparison results are summed. To supply the image comparisons, for example, the squares of all the differences between the image information values of the pixels of the first image area 1 and the pixels of the second image area 2 are summed such that an image comparison result is obtained, the numerical value of which becomes smaller the greater is the match between the two examined image areas 1, 2, and which in the extreme case is zero when the two examined image areas are identical, that is, when the two image areas match pixel for pixel.

The number of image comparison results B(Tn) provided by the image comparison step 103 corresponds to the number of selected test vectors T1-T3, of which preferably all are selected.

In a procedural step 104, the selected test vectors T1-T3 are compared with at least one of prediction vectors V1-V4 to provide vector comparison results V(Tn, Vm). Here, V(Tn, Vm) denotes a comparison result determined by a comparison of prediction vector Vm with test vector Tn, where Tn represents any of the selected test vectors T1-T3, while Vm represents any of the selected prediction vectors V1-V4. Preferably, all the prediction vectors V1-V4 are utilized for a comparison with all the test vectors T1-T3, thus producing a number of vector comparison results V(Tn, Vm) which corresponds to the product of the number of test vectors and the number of the prediction vectors.

In the determination of the vector comparison result, it is possible in particular to take into account the origin of the prediction vector, and, by taking into account a selectable offset in the comparison result, for example, to give those prediction vectors that were determined based on a previous image a lower evaluation than those prediction vectors that were determined for adjacent image areas based on the current image.

The comparison of a test vector Tn with a prediction vector Vm comprises, for example, determining the square of the absolute value of the difference vector between the test vector Tn and the prediction vector Vm.

The vector comparison results V(Tn, Vm) and the image comparison results B(Tn) are linked in a procedural step 105 to quality characteristics G(Tn, Vm). G(Tn, Vm) in FIG. 3 denotes a quality characteristic obtained by linking the image comparison result B(Tn) to the vector comparison result V(Tn, Vm). The linking operator is represented in FIG. 3 by the symbol "∘".

The linkage of the vector comparison results V(.) and the image comparison results B(.) can comprise various types of linkage, depending on the manner in which the comparison results V(.) and B(.) are obtained. Using the assumption that the image comparison result B(.) represents a numerical value which becomes smaller the greater are the matches between the examined image areas, and that the vector comparison result V(.) represents a numerical value, the value of which becomes smaller the smaller the difference between the examined test vector and the examined prediction vector, the linkage of the image comparison result B(.) and the vector comparison result V(.) can be implemented, for example, by weighted addition, where the applicable relation is:

$$G(Tn, Vm) = k_T \cdot B(Tn) + k_V \cdot V(Tn, Vm).$$

The sum of the weighting factors $k_T + k_V$ is one. How strongly the vector comparison result V(.) and the image comparison result B(.) are actually weighted is a function of the specific case of application, although neither of the two weighting factors $k_T$, $k_V$ is zero.

Figures 4, 5:
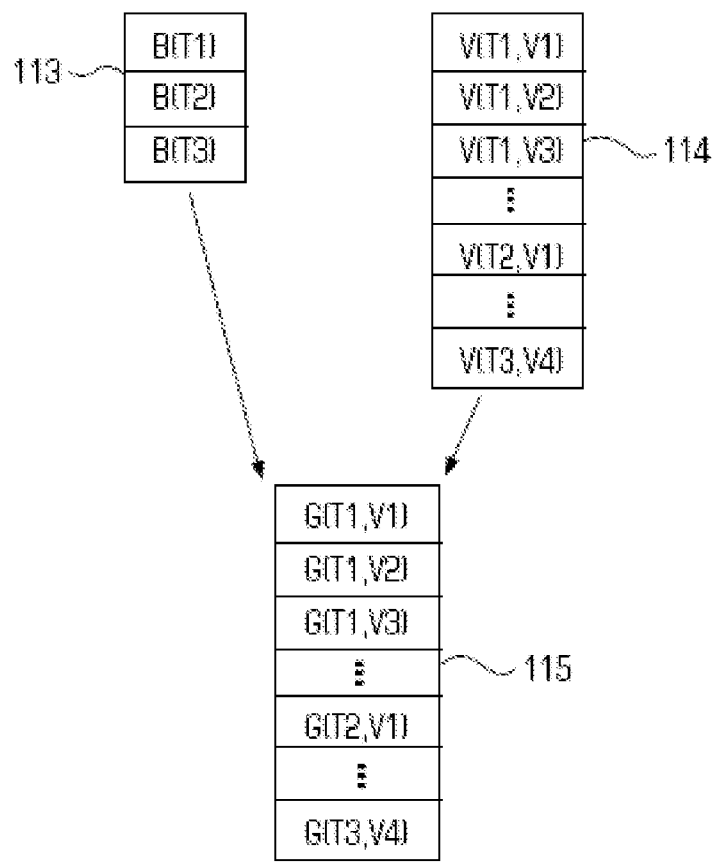
FIG. 4 illustrates tables including the image comparison results and vector comparison results which are linked to quality characteristics for the selected test vectors.
FIG. 5 illustrates a quality characteristic matrix.

FIG. 4 illustrates a table 113, generated in the procedural step 103, presenting the image comparison results B(T1) through B(T3), as well as a table 114, determined in the procedural step 104, presenting the vector comparison results V(T1, V1) through V(T3, V4) which are linked in the procedural step 105 to generate a table 115 with quality characteristics G(T1, V1) through G(T3, V4).

In a procedural step 106, a ranking order is determined by sorting, and at least the test vector for which the best quality characteristic has been determined is selected as the selection vector. The one or more selection vectors selected are identified in FIG. 3 by Ti.

Based on the assumption, by way of example, that the numerical values of the image comparison results B(.) become smaller the greater the match between the examined image areas, and that the vector comparison results V(.) become smaller the smaller the differences between an examined test vector and an examined prediction vector, and that the vector comparison results V(.) and the image comparison results B(.) are summed, it follows that the best quality characteristic is the quality characteristic with the smallest numerical value.

In a modification of the above-described method, in the procedural step 104 each of the selected test vectors T1-T3 is compared with each of the selected prediction vectors V1-V4 and the vector comparison results V(Tn, Vm) are supplied, whereas in the procedural step 105 only the best vector comparison result of a test vector is linked with the associated image comparison result B(.). As a result, Table 114 is reduced to a number of values which corresponds to the number of selected test vectors.

In addition, it is possible for each prediction vector V1-V4 to determine the test vector T1 which has the best quality criterion so that a number of test vectors is determined which corresponds to the number of test vectors.

FIG. 5 illustrates this procedure using a matrix in which the test vectors T1-T3 and the selection vectors V1-V4 are plotted, where the individual matrix elements represent, by way of example, one quality characteristic each associated with one test vector and one prediction vector. Based on the assumption that the quality characteristic is determined such that a specific test vector receives a better rating the smaller its quality characteristic, in the example the test vector T1 would be selected as the best vector for the prediction vector V1, the test vector T1 would be selected as the best vector for the prediction vector V2, the test vector T3 would be selected as the best vector for prediction vector V3, and test vector T2 would be selected as the best vector for prediction vector V4.

From these best test vectors, one test vector or multiple test vectors can then be selected, where during this selection the quality criterion determined for the given test vector, and/or the frequency at which a test vector is selected as the best test vector for the prediction vectors, can be taken into account.

In addition, the test vector determined for a selection vector can be stored as the new prediction vector, where the possibility exists to classify the selection vectors based on their origin and storing the test vectors obtained accordingly in an associated group.

In the illustration of FIG. 3, it is assumed that a set of test vectors 102 is supplied from which, by performing image comparisons and employing prediction vectors, at least one test vector Ti is selected which can be used as the selection vector.

Figure 6:
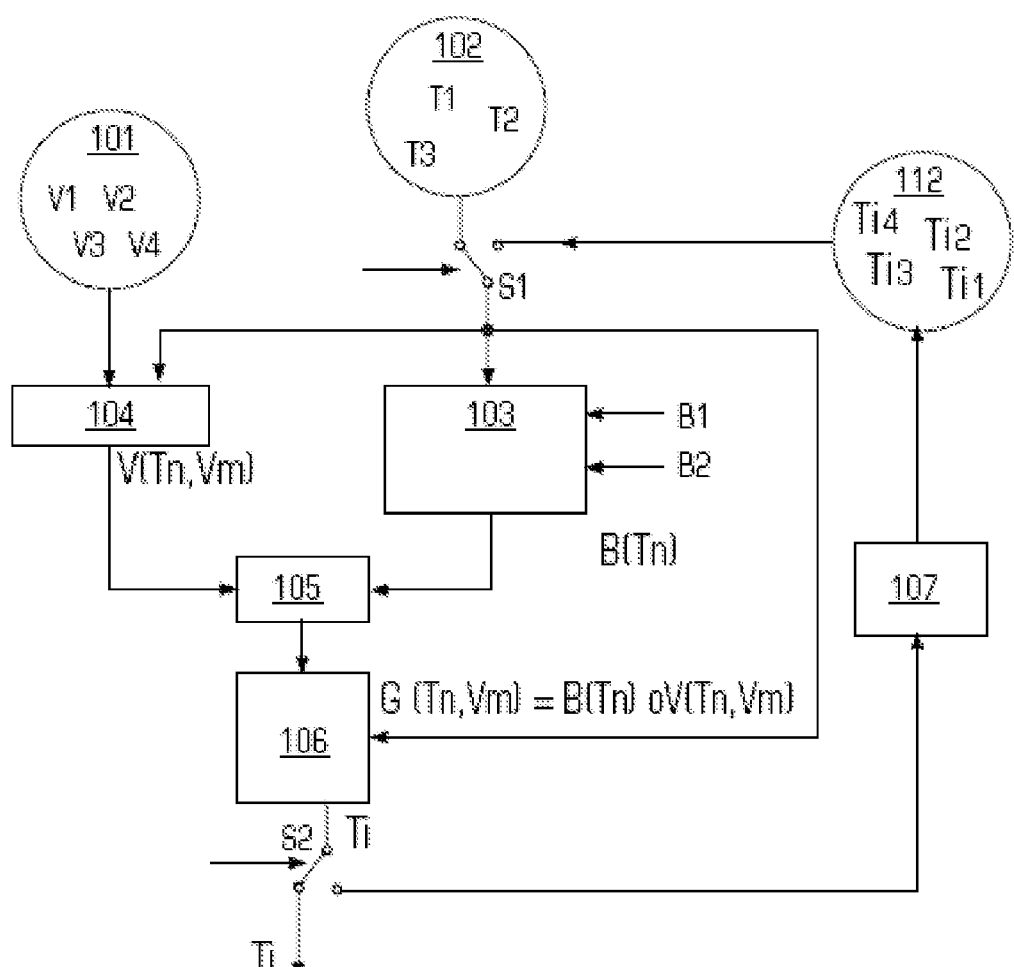
FIG. 6 is a flowchart for another embodiment of the method according to the invention wherein the at least one selection vector is determined iteratively from the set of test vectors.

In a modification of the procedure illustrated in FIG. 3, the flowchart of which is illustrated in FIG. 6, at least one selection vector is determined by an iterative method. In this method, a set of test vectors T1-T3 is supplied, and from this set of test vectors T1-T3 at least one test vector Ti is selected using a procedure already explained for FIGS. 3 and 4. In contrast to the method of FIG. 3, however, this test vector Ti is not outputted as the selection vector immediately after the first run of the method; instead this at least one test vector Ti serves in a procedural step 107 as the basis for generating an additional set of test vectors that are identified, by way of example, as Ti1, Ti2, Ti3, Ti4, where the already described procedure is implemented once again with this new set of test vectors in the manner described above. To illustrate more clearly the iterative character of the method of FIG. 6, FIG. 6 presents two switches S1, S2, where the switch S2 is in the position illustrated on the left at the start of the procedure to process the original set 102 of test vectors T1, T2, T3 in the procedural step 103, and where the switch S2 is in the position illustrated on the right at the start of the procedure to supply the at least one selected test vector Ti to the procedural step 107 to generate a new set 112 of test vectors Ti1-Ti4. During the subsequent iteration steps, the first switch S1 is in the position illustrated on the right to supply the test vectors of the set of test vectors generated from the selected test vectors Ti to the procedural step 103. At the end of the procedure, the second switch is moved to the position illustrated on the left to output the at least one selected test vector Ti as the selection vector.

Figure 7:
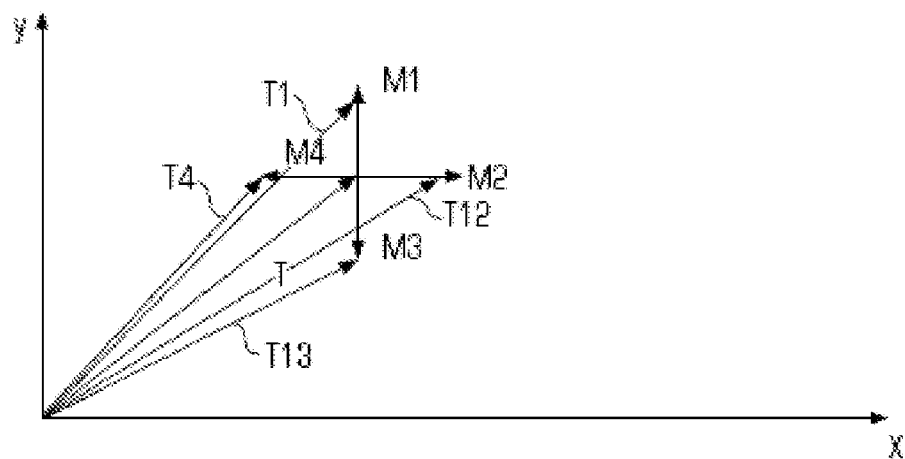
FIG. 7 illustrates a procedure for an iterative method to provide a set of test vectors using a selected test vector and using modification vectors as illustrated in FIG. 6.

FIG. 7 illustrates a possible design for the procedural step 107 in which the new set of test vectors 112 is supplied from at least one selected test vector Ti. FIG. 7 illustrates a selected test vector Ti in a Cartesian coordinate system where a set of four additional test vectors Ti1, Ti2, Ti3, Ti4 are generated from this test vector Ti by vectorial addition of four modification vectors M1-M4. Preferably, one of the modification vectors is a zero vector, with the result that the selected test vector Ti is also accepted into the set of new test vectors 112. The modification vectors illustrated, M1-M4, can be represented in Cartesian coordinates as (±a, 0) and (0, ±a), where a represents the absolute value of the modification vectors M1-M4. It is also possible to employ more than four modification vectors, to thereby generate from one selected test vector Ti more than four test vectors, or in the event the zero vector is used as a modification vector, more than five test vectors from one selected test vector Ti. Additional modification vectors include, for example, ($\pm 0.5 \cdot a \cdot \sqrt{2}$, $\pm 0.5 \cdot a \cdot \sqrt{2}$).

Preferably, the absolute value a of the modification vectors decreases with each iteration step, thereby generating one set of test vectors with each iteration step from one selected test vector Ti, which test vectors decreasingly differ from the selected test vector Ti.

With the described iterative method, it is also possible to take into account the origin of the prediction vector in the determination of the vector comparison result.

In addition, it is possible during each iteration step to determine the respective best test vector and use it for the subsequent iteration step. After the last iteration step, the respective best test vector determined for each prediction vector can be stored as a new prediction vector.

The modification of a test vector selected for the next iteration step is preferably implemented as a function of the quality characteristic determined during the previous iteration step. As a result, test vectors having a good quality characteristic are modified to a lesser degree than are test vectors having bad quality characteristics. This can be achieved, for example, by setting the absolute value of the modification vector as a function of the previously determined quality characteristic.

The method according to the invention for determining a selection vector using a set of test vectors and a set of prediction vectors is capable of determining selection vectors, where, for example, a set of test vectors is supplied which contains more test vectors than are required as selection vectors, and where by using the method so determined in each case the best test vectors can be selected as the selection vectors. The method according to the invention can also be used in connection with conventional methods in which the selection vectors are determined using the prediction vectors. At the same time, it is possible to employ, in addition to the prediction vectors, at least one test vector as a selection vector which was determined using the method according to the invention.

The selection vectors determined for a given image area can be utilized for subsequent search steps to determine the prediction vectors.

Although the present invention has been shown and described with respect to several preferred embodiments thereof, various changes, omissions and additions to the form and detail thereof, may be made therein, without departing from the spirit and scope of the invention.

What is claimed is:

1. A method for determining a selection vector which represents a displacement vector for a displacement of an image area from a first position in a first image to a second position in a second image, the method comprising the steps of:
   a) supplying a set of prediction vectors;
   b) supplying a predetermined set of test vectors;
   c) selecting at least one test vector from the set of test vectors, and performing an image comparison between a first image area in the first image and a second image area in the second image to obtain an image comparison result, wherein a position of the second image area is displaced relative to the first image area by the at least one selected test vector;
   d) comparing the at least one selected test vector with at least one selected prediction vector to obtain at least one vector comparison result for each selected test vector;
   e) supplying at least one quality characteristic for each selected test vector from both the image comparison result obtained for each selected test vector, and from the vector comparison result for each selected test vector;
   f) determining a ranking order of the quality characteristics; and
   g) selecting one of the selected test vectors as the selection vector from the set of test vectors based on the ranking order of the quality characteristics.

2. The method of claim 1, where one set of test vectors is assigned to each prediction vector or to one group each of the prediction vectors, where the step of comparing utilizes the test vector set to compare at least one selected test vector from the test vector set with at least one selected prediction vector.

3. The method of claim 1, where step of comparing determines a measure of a difference between each of the selected test vectors and the at least one selected prediction vector.

4. The method of claim 1, where step c) is implemented for all the test vectors.

5. The method of claim 1, where step d) is implemented for all the prediction vectors.

6. The method of claim 1, further comprising the step of linking the image comparison result for a selected one of the test vectors and the vector comparison result for a selected one of the prediction vectors, where the quality characteristic improves the less the selected test vector and the selected prediction vector differ from each other.

7. The method of claim 1, further comprising the step of determining at least one test vector for each prediction vector, and where the selection vector is selected from a plurality of the test vectors determined thereby.

8. The method of claim 1, where steps c) through f) are performed at least twice, where according to step g) at least one test vector is selected based on the ranking order of the quality characteristics, and where at least one test vector in a set of selected test vectors is generated for the subsequent image comparison in step c).

9. The method of claim 8, where during the steps c) through f) one test vector is determined for each prediction vector, and where a set of test vectors is generated for the subsequent image comparison in step c).

10. The method of claim 8, where from the selected test vector selected according to step g), one test vector of the predetermined set of test vectors is generated for the image comparison in step c) by vector addition with at least one modification vector.

11. The method of claim 10, where from the selected test vector selected according to step g), multiple test vectors are respectively generated by vector addition of multiple modification vectors.

12. The method of claim 11, where with each repetition of steps c) through f), the modification vectors employed match in terms of their direction and the absolute value of the modification vectors becomes smaller in subsequent iterations of steps c) through f).

13. The method of claim 11, where the modification vectors are a function of the determined quality characteristic supplied for the selected test vector.

14. The method of claim 13, where an absolute value of the modification vector becomes smaller as the quality characteristic improves.

15. The method of claim 1, further comprising the step of supplying a set of selection vectors as a function of a set of prediction vectors and a set of test vectors.

16. The method of claim 1, further comprising the step of storing the selection vectors as new prediction vectors.

17. The method of claim 1, further comprising the steps of presetting or modifying the selection vectors according to a random scheme, and storing the preset or modified selection vectors as new prediction vectors.

18. A method for determining a selection vector which represents a displacement vector for a displacement of an image area from a first position in a first image to a second position in a second image, the method comprising the steps of:
- iteratively selecting a test vector from a predetermined set of test vectors, and iteratively performing an image comparison between a first image area in the first image and a second image area in the second image to obtain an image comparison result;
- iteratively comparing the selected test vector with a prediction vector to obtain a vector comparison result;
- iteratively supplying a quality characteristic for the selected test vector from both the image comparison result and from the vector comparison result;
- determining a ranking order of a plurality of quality characteristics; and
- selecting one of the test vectors as the selection vector based on the ranking order of the quality characteristics.

19. The method of claim 18, further comprising the step of linking the image comparison result for a selected one of the test vectors and the vector comparison result for a selected one of the prediction vectors, where the quality characteristic improves the less the selected test vector and the selected prediction vector differ from each other.

20. A method performed in a processor for determining a selection vector which represents a displacement vector for a displacement of an image area from a first position in a first image to a second position in a second image, the method comprising the steps of:
- a) selecting at least one test vector from a predetermined set of test vectors, and performing an image comparison between a first image area in the first image and a second image area in the second image to obtain an image comparison result, where a position of the second image area is displaced relative to the first image area by the at least one selected test vector;
- b) comparing the at least one selected test vector with at least one selected prediction vector from a set of prediction vectors to obtain at least one vector comparison result for each selected test vector;
- c) supplying at least one quality characteristic for each selected test vector from both the image comparison result obtained for each selected test vector, and from the vector comparison result for each selected test vector;
- d) determining a ranking order of the quality characteristics;
- e) selecting one of the selected test vectors as a selection vector from the predetermined set of test vectors based on the ranking order of the quality characteristics;
- f) generating an updated set of test vectors which includes the test vector selected as the selection vector; and
- g) repeating steps (a) to (e) using the updated set of test vectors; and
- h) outputting a signal from the processor representative of the updated selection vector.

* * * * *